Figure 1:
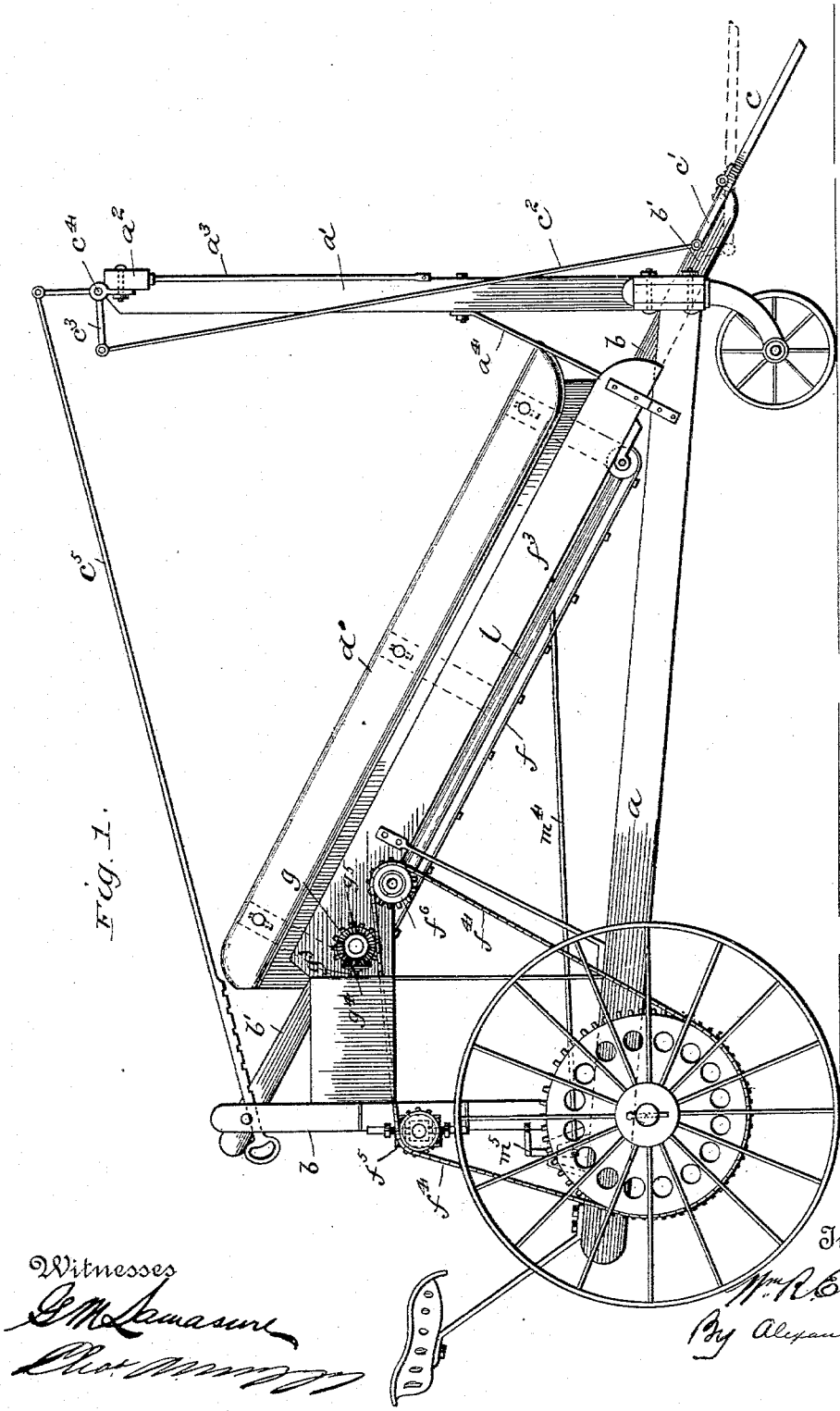

(No Model.) 2 Sheets—Sheet 1.

W. R. E. THARP.
CORN HARVESTER.

No. 533,756. Patented Feb. 5, 1895.

Witnesses
Inventor
W. R. E. Tharp
By Alexander & Davis
Attorneys

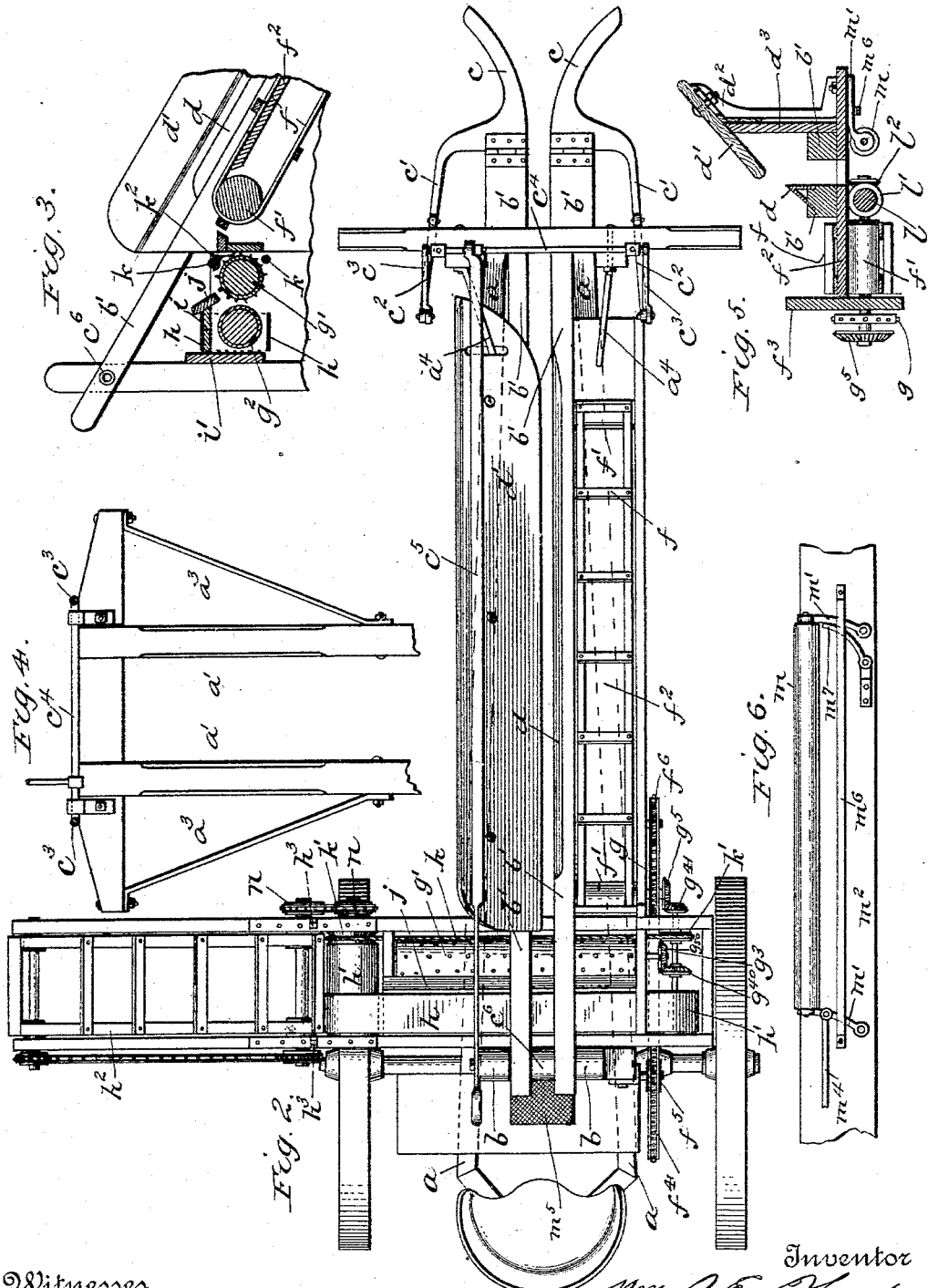

UNITED STATES PATENT OFFICE.

WILLIAM R. E. THARP, OF GLIDDEN, IOWA.

CORN-HARVESTER.

SPECIFICATION forming part of Letters Patent No. 533,756, dated February 5, 1895.

Application filed July 28, 1894. Serial No. 518,834. (No model.)

*To all whom it may concern:*

Be it known that I, WILLIAM R. E. THARP, a citizen of the United States, residing at Glidden, in the county of Carroll and State of Iowa, have invented certain new and useful Improvements in Corn-Harvesters, of which the following is a specification, reference being had therein to the accompanying drawings.

In the drawings, Figure 1 is a side elevation; Fig. 2, a plan; Fig. 3, a detail vertical section through a portion of the husking devices; Fig. 4, a detail view of the upper portion of the front part of the frame; Fig. 5, a detail vertical section taken through the stripping and elevating devices, and Fig. 6 a detail view hereinafter described.

This invention relates to that class of corn-harvesters in which the ears are stripped off the standing corn as the machine is drawn along over the field, the ears being conveyed to a husking mechanism and there automatically husked, as more fully hereinafter set forth.

The main frame $a$ has rigidly mounted on its front ends the uprights $a'$ which are separated sufficiently to permit free passage of the standing corn and which are connected at their upper ends by a cross-beam $a^2$, the projecting ends of this cross-beam being connected to the uprights $a'$ by oblique braces $a^3$ and the uprights themselves being braced by oblique braces $a^4$ connecting them to the main frame. Another pair of standards $b$ is mounted upon the main frame near the driver's seat at the rear of the machine, and these standards are connected to the front part of the machine by a pair of oblique beams $b'$ which extend downwardly and forwardly and beyond the front end of the main frame, these beams being separated a suitable distance to permit the passage of the standing corn as the machine moves along. The gatherers $c$ are hinged to the extreme forward ends of these beams $b'$ and the rearwardly extending arms $c'$ of the gatherers are connected by vertical rods $c^2$ to horizontal arms $c^3$ carried by a rock-shaft $c^4$ journaled on the cross-beam $a^2$; and the rock-shaft $c^4$ is operated to raise or lower the gatherers in unison, by means of a rod $c^5$ which is extended forwardly to be within convenient reach of the driver. A spacing-block $c^6$ is interposed between the upper ends of the beams $b'$, as shown most clearly in Fig. 2.

Secured on the inner upper edge of one of the beams $b'$ is a stationary knife $d$, whose cutting edge is directed upwardly, and supported above said knife and upon the opposite beam is a presser board $d'$, whose lower edge extends parallel to the knife and is arranged above the same and is rounded off. This presser board $d'$ is mounted adjustably upon brackets $d''$ to enable it to be adjusted closer to or farther from the knife as the exigencies of the case may require. It will be observed that this board $d'$ is parallel with the upwardly-inclined beams and knife and is set on an incline on its supports so as to direct its rounded inner edge downwardly toward the knife. This presser board $d'$ is also supported and braced by a board $d^3$ which is set on edge and secured to the adjacent beam $b'$.

Supported parallel to the knife and on the opposite side from the presser board is an elevator $f$, which receives the ears stripped from the stalks and conveys them upward to the husking devices. The elevator belts run upon suitable pulleys $f'$ and are supported intermediate these pulleys by a board $f^2$ projecting out laterally from the adjacent beam $b'$. To guard the elevator and keep the ears on the same a guard board $f^3$ is secured upon the outer edge of the board $f$, as shown most clearly in Fig. 5. The elevator is driven by a sprocket chain $f^4$ which runs on a suitable sprocket wheel on the rear axle and two idle sprocket wheels $f^5 f^6$, the former being vertically adjustable upon the rear standards $b$ in order to keep the chain taut. This chain engages a sprocket wheel $g$ secured on the shaft of the upper roller $f'$.

The husking devices consist essentially of a pair of horizontal rollers $g' g^2$ journaled in the frame under the upper ends of the beams $b'$ and adjacent to and transversely of the elevator belts. The front roller is spiked and is driven by suitable bevel gears from a shaft $g^3$ journaled in the frame out of line with the elevator belt, said shaft $g^3$ being driven by means of suitable bevel gears $g^{40}$, $g^{50}$, $g^4$ $g^5$, the latter being secured on the shaft of the upper roller $f'$. A transverse belt $h$ is supported by rollers $h'$ directly to the rear of the spike-roller and over the smooth roller, this belt serving to convey the husked corn out laterally to the elevator $h^2$. This elevator is hinged at $h^3$ to the frame of the husking mechanism in order that it may be folded over upon the main machine when not in use. A board $i$ supports the belt $h$ between its supporting rollers and a guard-board $i'$ is secured to the frame at the rear edge of the belt $h$ to keep the ears upon the belt during their transmission to the elevator $h^2$. An inclined board $j$ is secured to the front edge of the board $i$ and extends the full length of the husking roller and is supported close to the spiked roller $g'$. This narrow board extends upwardly and rearwardly and its upper edge terminates slightly above the belt $h$ and serves to prevent the husked ears from running off the front edge of the belt $h$. Extending across the upper end of the machine, immediately in front of the spiked roller is an endless cord $k$ which runs on grooved pulleys $k'$, carried by shaft $g^3$ and one of the rollers $h'$. The upper part of this cord $k$ travels continuously toward the elevator $h^2$ and is supported in the shallow trough $k^2$ secured to the frame between the upper roller $f'$ of the elevator $f$ and the spiked roller.

It will be observed that as the machine travels along the row, the stalks will be directed by the gatherers into the slot between the upwardly-inclined beams $b'$, and as the stalks pass along between these beams the rounded edge of the presser board will keep them pressed against the stationary knife and the knife will snap the ears off and permit them to drop upon the elevator $f$, which will carry the ears upward and deliver them to the husking mechanism.

It will be seen that should the ears be upon the side of the stalk next to the presser board, the stalks will be twisted sufficiently as they pass down through the beams to present the ears to the knife.

To prevent the stalks choking in the opening between the beams a long roller $l$ is journaled below the knife-carrying beam and parallel therewith, this roller being driven by a beveled wheel $l'$ which is secured to its upper end and meshes with a bevel pinion $l^2$ carried by the shaft of the roller $f'$, as shown most particularly in Fig. 5. The inner edge of this roller $l$ is approximately parallel with the inner edge of the knife-carrying beam. Another roller $m$ is journaled in brackets $m'$ upon the other side of the stalk-slot between the beams, this roller extending approximately the full length of the presser board and directly below and in line with the beam carrying the presser board. The brackets $m'$ are pivotally mounted on a board $m^2$, and these arms or brackets are connected together at their free ends by the roller $m$, and a rod $m^4$ connects them to a foot lever $m^5$ supported on the frame near the driver's seat, whereby the driver may press said roller $m$ toward the opposite roller in order to catch or grip any stalks that may have become detached from the ground and be dragging along with the machine. A bar $m^6$ confines said brackets to board $m^2$ and a spring $m^7$ keeps the roller and brackets in their normal position. The adjustability of the presser board permits said board to be readily set so as to properly turn and present the ears to the knife, as is evident.

As the ears leave the elevator $f$ they pass upon the spiked husking roller, the rapidly-moving cord $k$ serving to turn the ears around and present them sidewise to the husking rollers. The spiked roller, revolving very rapidly strips the husks from the ears and drops the husks out below, and the husked ears are pushed up over the beveled board $j$ upon the belt $h$, which latter immediately delivers them upon the elevator $h^2$.

The elevator $h^2$ may be driven by any suitable mechanism, for instance, by the usual sprocket-chain running over a sprocket wheel $n$ upon one end of the shaft carrying roller $h'$ and pulley $k'$.

The presser-board $d'$ is an important feature and its peculiar arrangement with reference to the knife is essential to its proper operation. It will be observed that it is mounted above and parallel with the knife and on the opposite side of the slot therefrom and is inclined downwardly toward the knife, its lower rounded edge terminating almost perpendicularly over the same. This arrangement insures all the ears being snapped off by the knife, as the board not only slightly bends the stalks over against the upturned edge of the knife but also (by reason of its inclined and elevated position) twists them around so as to properly present them to the knife should the ears be on the off side. This action of the presser board and knife is peculiar. As the stalks pass down between the board and knife, the ears if they be on the presser board side, impinge against the inclined surface of the presser board and are twisted forwardly as they pass down over the rounded edge of the board, and while the board is pressing the ears around the upwardly-turned knife engages under their butts and readily snaps them off. It will be seen that in order that all of the ears shall be engaged and properly twisted and held against the knife the presser board must not only be located above the knife and have its inner longitudinal edge terminate almost perpendicularly above the knife, but it must also have its upper face inclined or beveled downwardly throughout its length toward the cutting edge of the knife.

The rapidly-moving cord $k$, arranged as shown, is also important, as it quickly turns the ears around as they come up endwise off the elevator and presents them sidewise to the spiked roller, which is necessary to insure the ears being quickly and completely husked.

The gripping roller $m$ arranged below the stalk-slot and normally pressed away from the same and adapted to be pressed up toward the opposite roller to grip any stalks that may be pulled up or broken off and forcibly pull them down through the ear-removing mechanism, is important also as it obviates another difficulty encountered in machines of this class as heretofore constructed.

Having thus fully described my invention, what I claim is—

1. The combination, in a corn harvester, of a frame, stripping mechanism, an elevator $f$, husking rollers mounted at the upper end thereof and at right angles thereto, and an endless rapidly-moving cord or belt $k$ running parallel to the husking rollers and between the same and the elevator, as and for the purpose set forth.

2. In a corn harvester, the combination of a frame, stripping mechanism, an elevator $f$, a pair of parallel husking rollers journaled at the upper end of said elevator and at right angles to the same, the front one of said rollers being spiked and adapted to rotate toward the other roller, a conveying-belt $h$ supported above the rear roller, and a board $j$ supported parallel and adjacent to the front edge of the said conveying belt and extending above the same and inclining downwardly toward said spiked roller, substantially as described.

In testimony whereof I affix my signature in presence of two witnesses.

WILLIAM R. E. THARP.

Witnesses:
M. LINN,
ART. E. BEACH.